(12) United States Patent
Cheng et al.

(10) Patent No.: US 8,723,897 B2
(45) Date of Patent: May 13, 2014

(54) DISPLAY PANEL WITH IMPROVING DISPLAY QUALITY

(75) Inventors: Hsiang-Yuan Cheng, Hsin-Chu (TW);
Shih-Hsun Lo, Hsin-Chu (TW);
Shan-Fu Yuan, Hsin-Chu (TW);
Chen-Lun Chiu, Hsin-Chu (TW);
Yu-Wei Liao, Hsin-Chu (TW);
Chia-Yang Cheng, Hsin-Chu (TW)

(73) Assignee: AU Optronics Corp., Hsinchu (TW)

( * ) Notice: Subject to any disclaimer, the term of this patent is extended or adjusted under 35 U.S.C. 154(b) by 218 days.

(21) Appl. No.: 13/218,644

(22) Filed: Aug. 26, 2011

(65) Prior Publication Data
US 2012/0162278 A1    Jun. 28, 2012

(30) Foreign Application Priority Data

Dec. 23, 2010 (TW) .............................. 99145599 A

(51) Int. Cl.
*G09G 5/10* (2006.01)
*G09G 3/36* (2006.01)

(52) U.S. Cl.
USPC .............................. 345/690; 345/87; 345/103

(58) Field of Classification Search
USPC ...................................... 345/88, 96, 690, 694
See application file for complete search history.

(56) References Cited

U.S. PATENT DOCUMENTS

| | | | |
|---|---|---|---|
| 5,151,689 A | * | 9/1992 | Kabuto et al. .................. 345/103 |
| 2006/0164350 A1 | * | 7/2006 | Kim et al. ........................ 345/87 |
| 2007/0070262 A1 | | 3/2007 | Hung et al. |
| 2010/0149142 A1 | | 6/2010 | Hsu et al. |
| 2010/0156868 A1 | | 6/2010 | Hirayama et al. |

FOREIGN PATENT DOCUMENTS

| | | |
|---|---|---|
| CN | 1779766 | 5/2006 |
| CN | 2842649 | 11/2006 |
| CN | 101477283 | 7/2009 |
| TW | 200823852 | 6/2008 |
| TW | 201030729 A1 | 8/2010 |

OTHER PUBLICATIONS

Taiwan Patent Office, "Office Action", Aug. 12, 2013.

* cited by examiner

*Primary Examiner* — Alexander Eisen
*Assistant Examiner* — Amit Chatly
(74) *Attorney, Agent, or Firm* — WPAT, PC; Justin King

(57) ABSTRACT

An exemplary display panel includes a plurality of monochrome pixels, a plurality of data lines and a plurality of control lines. Each monochrome pixel provides a specific color on the display panel. The data lines are electrically coupled to the monochrome pixels for providing the display data. The data lines includes a first data line electrically coupled to a part of the monochrome pixels, and the specific colors provided by the part of the monochrome pixels are of the same color. Besides, each of the control lines is electrically coupled to a part of the monochrome pixels for controlling the part of the monochrome pixels electrically coupled thereto whether to receive the display data from the data lines.

10 Claims, 2 Drawing Sheets

DISPLAY PANEL WITH IMPROVING DISPLAY QUALITY

TECHNICAL FIELD

The disclosure generally relates to display panels, and more particularly to a display panel can achieve an improved display quality by way of the change of data transient manner.

RELATED ART

With the development and progress of display technologies, a variety of display panels have been widely used in daily life, and the driving technology of display panel plays an important role to the display quality thereof.

FIG. 1 is a schematic view of a pixel array in a conventional display panel. As depicted in FIG. 1, the conventional display panel 100 comprises multiple monochrome pixels 110, multiple data lines 130, and multiple control lines 150. Each of the monochrome pixels 110 is configured (i.e., generally structured and arranged) to provide a specific color such as a red, a green or a blue color on the display panel 100. The monochrome pixels 110 electrically coupled to a same control line 150 are configured to provide a same specific color. The data lines 130 are electrically coupled to the monochrome pixels 110 and arranged perpendicularly to the control lines 150. Each of the data lines 130 is configured to provide multiple display data for monochrome pixels, and the monochrome pixels 110 receiving the display data are electrically coupled to different control lines 150. Because the specific colors provided by the monochrome pixels electrically coupled to the same data line are not a same specific color, so that under the display of a pure-color image, display data delivered by the same data line would need to be frequently transient in response to different specific colors. As a result, since the amount of transients is excessively large, a time delay of display data delivery on the data lines and a control signal distortion on the control lines would result in insufficient charging for the monochrome pixels, and therefore the display panel would easily occur display color difference with respect to a desired color.

SUMMARY

Specifically, in one aspect, a display panel in accordance with an embodiment of the disclosure comprises a plurality of monochrome pixels, a plurality of data lines and a plurality of control lines. Each of the monochrome pixels provides a specific color on the display panel. The data lines are electrically coupled to the monochrome pixels for providing display data. The data lines comprise a first data line. The first data line is electrically coupled to a part of the monochrome pixels, and the specific colors provided by the part of the monochrome pixels are of the same color. In addition, each of the control lines is electrically coupled to a part of the monochrome pixels for controlling the part of the monochrome pixels electrically coupled thereto whether to receive the display data from the data lines.

Moreover, the part of the monochrome pixels, electrically coupled to the first data line, are respectively electrically coupled to different control lines, and two of the part of the monochrome pixels electrically coupled to the first data line, respectively electrically coupled to adjacent two of the control lines, are arranged at two sides of the first data line.

In another aspect, a display panel in accordance with another embodiment of the disclosure comprises a plurality of data lines, a plurality of monochrome pixels and a plurality of control lines. The data lines comprise a first data line, a second data line and a third data line for providing display data. In addition, each of the monochrome pixels is for providing one of a first color, a second color and a third color on the display panel. In addition, each of the control lines is electrically coupled to a part of the monochrome pixels for controlling the part of the monochrome pixels electrically coupled thereto whether to receive the display data from the respective data lines.

Moreover, the second data line is substantially linearly extended, and the monochrome pixels are arranged in two columns along an extension direction of the second data line. The first data line is electrically coupled to some of the monochrome pixels for providing the first color, the second data line is electrically coupled to some of the monochrome pixels for providing the second color, and the third data line is electrically coupled to some of the monochrome pixels for providing the third color.

Besides, the monochrome pixels electrically coupled to the first data line for providing the first color are electrically coupled to different control lines, and two of the monochrome pixels for providing the first color, respectively electrically coupled to adjacent two of the control lines, are arranged at different sides of the first data line.

BRIEF DESCRIPTION OF THE DRAWINGS

The above embodiments of the disclosure will become more readily apparent to those ordinarily skilled in the art after reviewing the following detailed description and accompanying drawings, in which.

DETAILED DESCRIPTION OF EMBODIMENTS

The disclosure will now be described more specifically with reference to the following embodiments. It is to be noted that the following descriptions of embodiments are presented herein for purpose of illustration and description only. It is not intended to be exhaustive or to be limited to the precise form disclosed.

Figure 1:
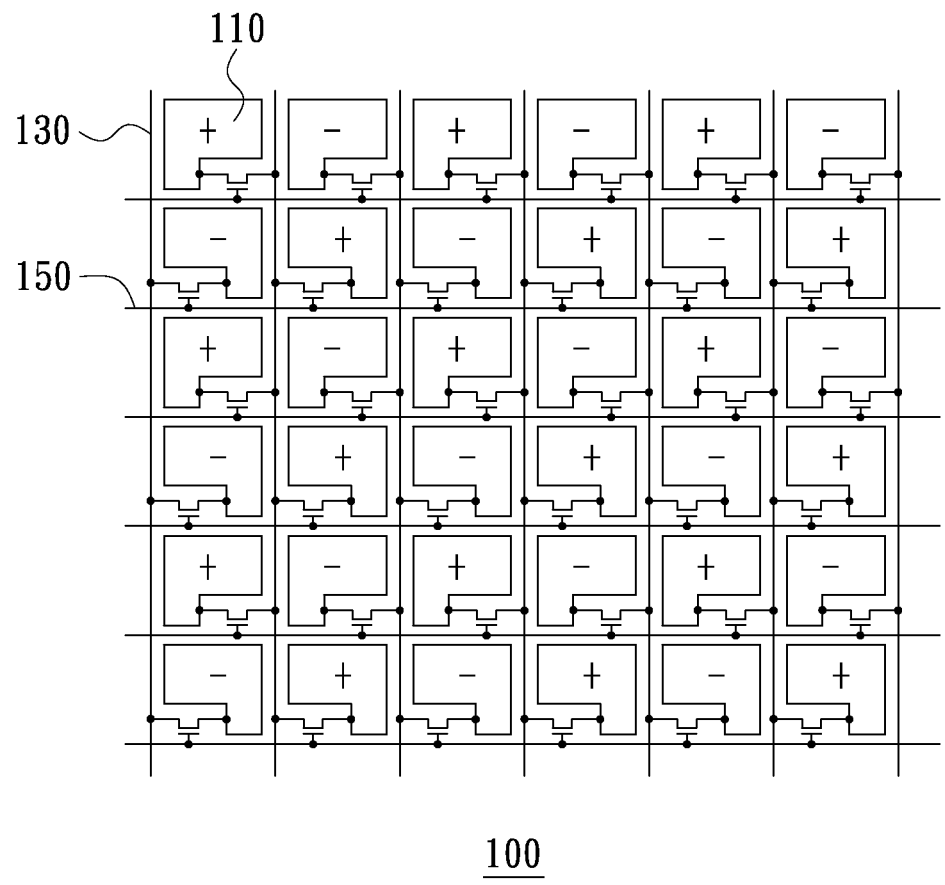
FIG. 1 is a schematic view of a pixel array in a conventional display panel.
Figure 2:
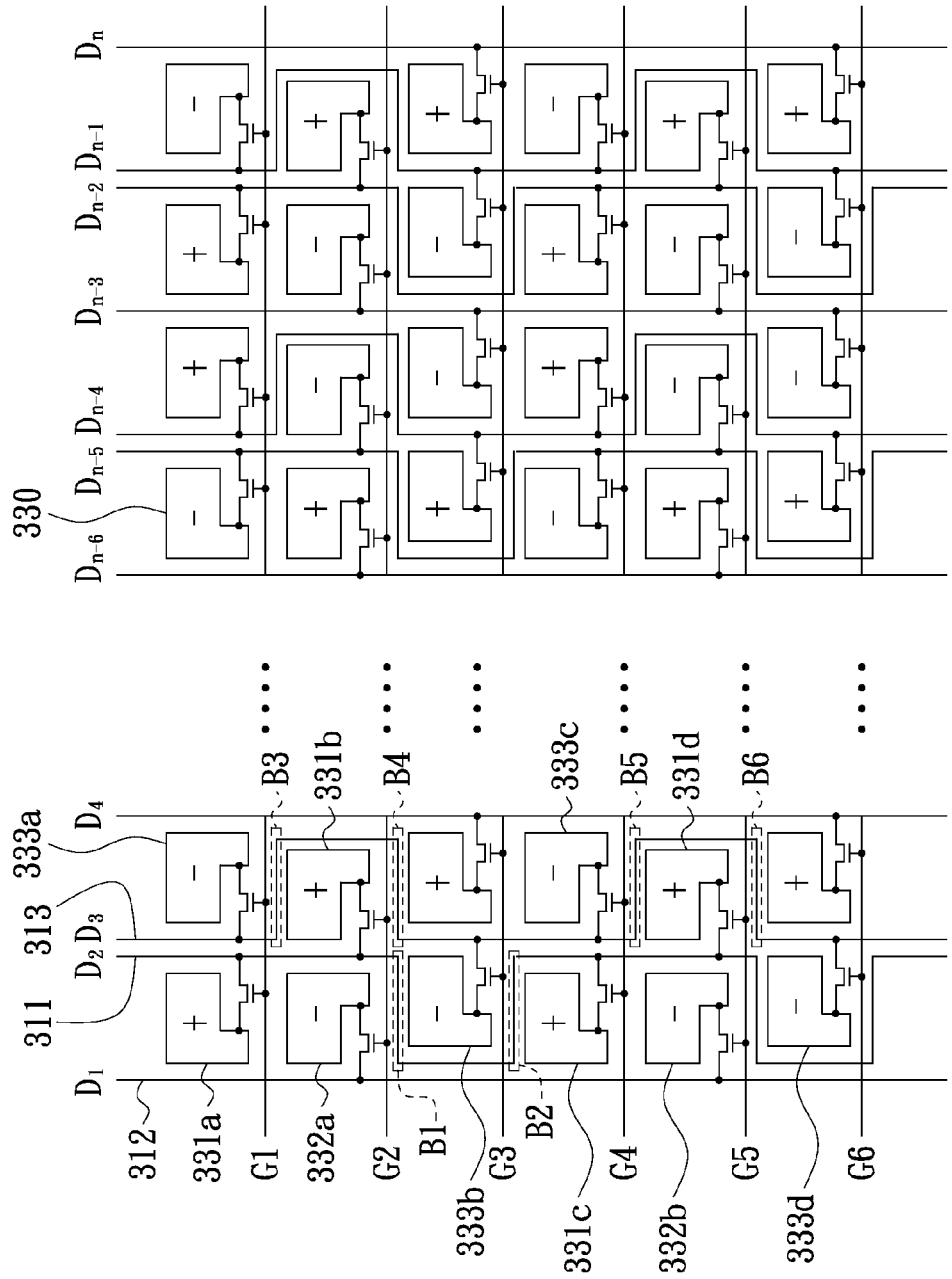
FIG. 2 is a schematic circuit structural view of a display panel in accordance with an embodiment.

FIG. 2 is a schematic circuit structural view of a display panel in accordance with an embodiment of the disclosure. As depicted in FIG. 2, the display panel 300 in the illustrative embodiment comprises multiple data lines $D_1 \sim D_n$, multiple monochrome pixels (e.g., monochrome pixels 330), and multiple control lines G1~G6. To achieve a description consistency in the specification, in the illustrative embodiment, the data line $D_2$ is also defined as a first data line 311, the data line $D_1$ is also defined as a second data line 312, and the data line $D_3$ is also defined as a third data line 313. The data lines $D_1 \sim D_n$ are configured to provide display data. Each of the monochrome pixels 330 is configured to provide one of a first color, a second color and a third color on the display panel 300. Moreover, in order to maintain the display quality of the display panel 300, when a same monochrome pixel provides a same display result in consecutive two frames, the display data provided by the data lines $D_1 \sim D_n$ correspondingly would have a polarity inversion from one of positive and negative polarities to the other one. In addition, each of the control lines G1~G6 is electrically coupled to a part of the monochrome pixels to control the part of the monochrome pixels whether to receive display data from the respective data lines $D_1 \sim D_n$.

In the illustrative embodiment, the data lines $D_1 \sim D_n$ have a repeated design manner, for the purpose of simplifying the description, the aforementioned first data line 311, the second data line 312 and the third data line 313 are categorized to an exemplary group for an explanation of the design concept of the present invention. As depicted in FIG. 2, the second data line 312 approximately linearly extends, and the monochrome pixels 330 located between the data lines D1 and D4 are arranged in two columns along the lengthwise extension direction of the second data line 312. Moreover, the first data line 311 is electrically coupled to the monochrome pixels 331*a*, 331*b*, 331*c* and 331*d* configured to provide the first color, the second data line 312 is electrically coupled to the monochrome pixels 332*a* and 332*b* configured to provide the second color, and the third data line 313 is electrically coupled to the monochrome pixels 333*a*, 333*b*, 333*c* and 333*d* configured to provide the third color. Herein, the first, second and third colors are different colors; for example, the first, second and third colors can be any arrangement of red, green and blue colors, but not to limit the disclosure.

In addition, the monochrome pixels electrically coupled to a same data line are respectively electrically coupled to different ones of the control lines G1~G6; and in the aforementioned monochrome pixels electrically coupled to the same data line, any two of the monochrome pixels electrically coupled to the same data line, respectively electrically coupled to adjacent two of the control lines G1~G6, are arranged at two sides of the same data line. For example, the monochrome pixels 331*a*-331*d* electrically coupled the first data line 311 are all for providing the first color and respectively electrically coupled to different control lines G1, G2, G4 and G5, and the two monochrome pixels e.g., 331*a* and 331*b* (or, 331*c* and 331*d*) respectively electrically coupled to two adjacent control lines e.g., G1 and G2 (or, G4 and G5) are arranged at two sides of the first data line 311. Because these monochrome pixels for example 331*a*-331*d* are configured to provide a same color and respectively electrically couple to different control lines G1, G2, G4 and G5, and sequentially receive display data from the first data line 311 under the control of the respective control lines G1, G2, G4 and G5; these monochrome pixels 331*a*-331*d* electrically coupled to the first data line 311 accordingly are configured to provide a same specific color and have a same polarity, so that in a pure-color or a same gray-level image, display data received by these monochrome pixels 331*a*-331*d* are identical with each other, suppressing the high-speed transient phenomenon caused by the same data line 311 needed to provide display data for different specific colors in the prior art It is noted that the aforementioned design manner is also applied to other data lines and corresponding monochrome pixels, and therefore detailed description associated therewith will not be repeated hereby.

More specifically, still referring to FIG. 2, the first data line 311 is structured to successively cross through multiple control lines e.g., G1, G2 and then be more close and substantially parallel to the second data line 312 through a first bending portion B1, afterwards the first data line 311 is structured to be in a specific area at a side of an imaginary extension line of the portion of the first data line before the first bending portion B1 by a second bending portion B2. Herein, the amount of the control lines which the first data line 311 successively crosses through before the first bending B1 for example is two, but it not to limit the disclosure. In another aspect, the amount of the control line which the first data line 311 crosses through after the first bending portion B1 and before the second bending portion B2 for example is one, but in other embodiment, the amount can be changed according to the requirement of design Beyond that, the third data line 313 is structured to successively cross through multiple control lines e.g., G3, G4 and then be farther to the second data line 312 by a third bending portion (B3 or B5) and further extend along a main extension direction (herein, generally same as the lengthwise extension direction of the second data line 312 in the illustrative embodiment) of the third data line 313, and subsequently structured to be in a specific area next to an imaginary extension line of the portion of the third data line 313 before the third bending portion (B3 or B5) by fourth bending portion (B4 or B6). Herein, the amount of the control lines which the third data line 313 successively crosses through before the third bending portion for example is two, but it is not to limit the disclosure.

By way of the aforementioned layout design, the monochrome pixels electrically coupled to a same data line are arranged in zigzag manner, which can reduce the display color difference caused by polarity inversion of monochrome pixels; meanwhile since the monochrome pixels electrically coupled to the same data lines are given a same polarity, the power consumption is also reduced. Besides, because several monochrome pixels have an opposite polarity with respect to multiple neighboring monochrome pixels thereof, which not only can relieve the display color difference phenomenon caused by polarity inversion of monochrome pixels, but also can suppress the crosstalk among the monochrome pixels.

To sum up, in the display panel of the disclosure, because the monochrome pixels electrically coupled to a same data line all provide a same color and have a same polarity, in the display of a pure-color or a fixed gray-level image, the high-speed transient in the prior art caused by the same data line is needed to provide display data to the monochrome pixels for providing different specific colors can be avoided, so that the display color difference caused by the time delay of display data delivery and the signal distortion on the control lines can be relieved. In addition, by changing the layout design, although the monochrome pixels electrically coupled to a same data line have a same polarity, several monochrome pixels still have an opposite polarity with respect to multiple neighboring monochrome pixels thereof, thereby not only reducing the display color difference phenomenon visible for the user but also reducing the crosstalk among the monochrome pixels, the display quality of the display panel is improved consequently.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A display panel comprising:
   a plurality of monochrome pixels, wherein each of the monochrome pixels is for providing a specific color;
   a plurality of data lines, electrically coupled to the monochrome pixels for providing display data, wherein the data lines comprise a first data line, the first data line is electrically coupled to a respective part of the monochrome pixels; and a plurality of control lines, wherein each of the control lines is electrically coupled to a respective part of the monochrome pixels;

wherein a Nth of the plurality of the monochrome pixels electrically coupled to the first data line is electrically coupled to a Mth of the plurality of the control lines, a (N+1)th of the plurality of the monochrome pixels electrically coupled to the first data line is electrically coupled to a (M+1)th of the plurality of the control lines, a (N+2)th of the plurality of the monochrome pixels electrically coupled to the first data line is electrically coupled to a (M+3)th of the plurality of the control lines, a (N+3)th of the plurality of the monochrome pixels electrically coupled to the first data line is electrically coupled to a (M+4)th of the plurality of the control lines, wherein N and M are integers.

2. The display panel according to claim 1, wherein the monochrome pixels electrically coupled to the first data line and arranged at left side thereof and the monochrome pixels electrically coupled to the first data line and arranged at right side thereof are respectively arranged in two different columns, and the specific colors provided by the monochrome pixels electrically coupled to the first data line are the same color.

3. The display panel according to claim 1, wherein the monochrome pixels electrically coupled to the first data line and arranged at left side thereof and the monochrome pixels electrically coupled to the first data line and arranged at right side thereof are respectively arranged in two different rows, and the specific colors provided by the monochrome pixels electrically coupled to the first data line are the same color.

4. The display panel according to claim 1, wherein the monochrome pixels electrically coupled to the first data line provide a same polarity.

5. A display panel comprising:
a plurality of monochrome pixels, wherein each of the monochrome pixels is for providing a specific color;
a plurality of data lines, electrically coupled to the monochrome pixels for providing display data, wherein the data lines comprise a first data line, a second data line, a third data line and a fourth data line, the first data line, the second data line, the third data line and the fourth data line each are electrically coupled to a respective part of the monochrome pixels; and
a plurality of control lines, wherein each of the control lines is electrically coupled to a respective part of the monochrome pixels; wherein a Nth of the plurality of the monochrome pixels is electrically coupled to the third data line and electrically coupled to a Mth of the plurality of the control lines, a (N+1)th of the plurality of the monochrome pixels is electrically coupled to the first data line and electrically coupled to a (M+1)th of the plurality of the control lines, a (N+2)th of the plurality of the monochrome pixels is electrically coupled to the fourth data line and electrically coupled to a (M+2)th of the plurality of the control lines, wherein N and M are integers.

6. The display panel according to claim 5, wherein the monochrome pixels electrically coupled to the first data line provide the same specific color and a same polarity.

7. The display panel according to claim 5, wherein the monochrome pixels electrically coupled to the second data line provide the same specific color and a same polarity.

8. The display panel according to claim 5, wherein the monochrome pixels electrically coupled to the third data line provide the same specific color and a same polarity.

9. The display panel according to claim 5, wherein the monochrome pixels electrically coupled to the fourth data line provide the same specific color and a same polarity.

10. The display panel according to claim 5, wherein a Pth of the plurality of the monochrome pixels is electrically coupled to the first data line and electrically coupled to the Mth of the plurality of the control lines, a (P+1)th of the plurality of the monochrome pixels is electrically coupled to the second data line and electrically coupled to the (M+1)th of the plurality of the control lines, and a (P+2)th of the plurality of the monochrome pixels is electrically coupled to the third data line and electrically coupled to the (M+2)th of the plurality of the control lines, wherein P is an integer.

* * * * *